(12) United States Patent
Thomas et al.

(10) Patent No.: US 7,114,935 B2
(45) Date of Patent: Oct. 3, 2006

(54) CURING ENVELOPE FOR AND METHOD OF RETREADING TIRES

(75) Inventors: Mark Thomas, Mt. Blanchard, OH (US); Bruce A. Currie, Findlay, OH (US)

(73) Assignee: Cooper Technology Services, LLC, Findlay, OH (US)

( * ) Notice: Subject to any disclaimer, the term of this patent is extended or adjusted under 35 U.S.C. 154(b) by 98 days.

(21) Appl. No.: 10/337,965

(22) Filed: Jan. 7, 2003

(65) Prior Publication Data

US 2003/0218275 A1    Nov. 27, 2003

Related U.S. Application Data

(60) Provisional application No. 60/346,689, filed on Jan. 7, 2002.

(51) Int. Cl.
    *B29D 30/56* (2006.01)
(52) U.S. Cl. .......................... 425/20; 156/96; 156/382; 156/909; 425/24; 425/812
(58) Field of Classification Search .................. 425/17, 425/20, 23, 24, 812; 156/96, 382, 909
    See application file for complete search history.

(56) References Cited

U.S. PATENT DOCUMENTS

| 4,116,605 A | 9/1978 | Burrell |
| 4,198,367 A | 4/1980 | Burrell |
| 5,173,353 A | 12/1992 | Yamamoto |
| 5,281,118 A * | 1/1994 | Alvarenga ................... 156/909 |
| 5,306,130 A * | 4/1994 | King et al. .................... 425/20 |
| 5,882,471 A * | 3/1999 | Chandler et al. ........... 156/909 |
| 6,056,852 A | 5/2000 | Presti et al. |
| 6,261,409 B1 * | 7/2001 | Presti .......................... 425/17 |

* cited by examiner

*Primary Examiner*—James P. Mackey
(74) *Attorney, Agent, or Firm*—Fay, Sharpe, Fagan, Minnich & McKee, LLP (57) ABSTRACT

The present invention provides for proper air bleed without using air wicking fabric strips and/or the perforated polyethylene material or the like. Instead, an inside surface of a curing envelope is molded with a unique embossed pattern which is designed to channel to a vacuum valve, expeditiously, all the air being evacuated from between the outer surface of a tire and an inner surface of the envelope. Additionally, a valve base area is recessed so as to allow the air channels to open directly into the valve base area during evacuation. The envelope is also designed to accept various styles and designs of air valves. Another unique feature is the creation of a decorative pattern on the inside shoulder area of a tire by transfer of a surface feature from the envelope interior. This pattern provides a significant improvement in the appearance of the finished tire.

5 Claims, 10 Drawing Sheets

| DETAIL NO. | DESCRIPTION |
|---|---|
| 28 | 3/8 - 16NC X 3" LG. SOC. HD. CAP SCREW |
| 27 | ENVELOPE VALVE DETAILS (LARGE) |
| 26 | ENVELOPE VALVE DETAILS (SMALL) |
| 25 | T304 HEX MALE PIPE FITTING |
| 24 | 1/2 - 13NC X 15 1/2" LG. HEX HD. BOLT |
| 23 | 1/4 - 20NC X 1 1/2" LG. FLAT SOC. HD. SCREW |
| 22 | 3/8 - 16NC X 1 1/2" LG. SOC. HD. CAP SCREW |
| 21 | 1/2 - 13NC X 8" LG. SOC. HD. CAP SCREW |
| 20 | 1/4 - 20NC X 1 1/4" LG. SOC. HD. CAP SCREW |
| 19 | 1/2 DIA X 1" LG. JERGENS PULL TYPE DOWEL PIN |
| 18 | 1/4 - 20NC X 1" LG. SEC. HD. CAP SCREW |
| 17 | PIPE PLUG |
| 16 | FLEXONIC TUBING (LENGTH TO SUIT) |
| 15 | BLOW OFF VALVE ASSEMBLY |
| 14 | 19" TOP SKIRT RING DETAILS |
| 13 | 17" TOP SKIRT RING DETAILS |
| 12 | 15" TOP SKIRT RING DETAILS |
| 11 | INJECTION CONE CLAMP PLATE DETAILS |
| 10 | INJECTION CONE DETAILS |
| 9 | TOP MOLD HALF DETAILS |
| 8 | TOP O.D. RING DETAILS |
| 7 | BOTTOM O.D. RING DETAILS |
| 6 | 19" BOTTOM SKIRT RING DETAILS |
| 5 | 17" BOTTOM SKIRT RING DETAILS |
| 4 | 15" BOTTOM SKIRT RING DETAILS |
| 3 | CORE KEY |
| 2 | CORE DETAILS |
| 1 | BOTTOM MOLD HALF |
| DETAIL NO. | DESCRIPTION |

CURING ENVELOPE FOR AND METHOD OF RETREADING TIRES

CROSS-REFERENCE TO RELATED APPLICATIONS

This application hereby incorporates by reference and claims the priority benefit of U.S. provisional application Ser. No. 60/346,689, filed Jan. 7, 2002.

FIELD OF THE INVENTION

The invention relates to retreading tires using the Pre-Cure process in which curing envelopes are a critical component.

BACKGROUND OF THE INVENTION

Retreading Processes

There are basically two different approaches to retreading tires, particularly pneumatic tires for vehicles. The Mold-Cure process involves removing as much rubber as is practically possible from a worn tire carcass, from both the tread and sidewall portions, and then applying new uncured material to these surfaces. The tire is then placed in a mold (e.g. autoclave) and cured much as new tires are cured.

The Pre-Cure process, involves the use of curing envelopes. In this process the old tread rubber is removed from only the tread area of the tire carcass. A thin layer of uncured gum rubber is then applied to the surface of this prepared tread area and new pre-cured tread material is applied over the uncured gum rubber. Such a pre-cured tread is a long, flat strip of tread rubber into which has already been molded, or cured, all the features of the finished tread, i.e., grooves, lugs, tread elements, sipes, etc. This tread strip is wrapped circumferentially around the outer surface of the gum rubber layer and the ends of the tread strip are trimmed and butt-spliced together.

The resultant assembly then needs to be exposed to heat, ordinarily in a pressurized chamber (e.g. an autoclave), sufficiently to bond that assembly to the tire carcass permanently. At this point in the process the curing envelope comes into play.

Also, in the current process air wicking material is applied in the evacuating valve area, and often strips of perforated polyethylene material are also used to enhance air bleed and appearance (see above regarding wicking devices). Failure to properly bleed air between the curing envelope and tire can result in a defective cure, reduced productivity, and lost profit opportunity.

Curing Envelopes

There are two basic methods of preparing for and curing the tire assembly in an autoclave. Both involve the use of curing envelopes. The rimseal method (see U.S. Pat. No. 6,056,852) involves the use of a curing tube inside the tire, a curing envelope on the outside of the tire, and a two-piece rim assembly which seals the curing envelope at the tire beads. The rimless method as practiced involves optional use of an inside envelope extending from inside the tire and around the beads and about half the distance up the outside surface of the tire sidewalls. A curing envelope is then placed over the outside of the tire tread and extends around the tire sidewall and over the ends of the inside envelope. At this overlap the two envelope parts create a seal.

In both these methods, a vacuum is then applied through a valve to the inside of the curing envelope. This, in effect, causes the envelope to create an inward force around the exterior of the pre-cured tread, compressing it against the gum rubber and carcass of the tire. Positive pressure is also applied to the inner surface of the tire by pressurizing the curing tube or, in the case of the rimless method, by the pressure being applied within the autoclave itself.

Curing in an Autoclave

In both systems, the assembly is placed in a large autoclave and exposed to both pressure and heat for a period of time. This pressure applied from both inside and outside the tire, combined with the heat within the autoclave, forms a tight and permanent bonding of the pre-cured tread with the gum rubber and the tire carcass. Once cured, the assembly is removed from the autoclave and the curing envelope and rim parts (and inside envelope if used) are removed from the tire. After inspection, the tire is ready for use.

Envelopes are used more than one time. Curing envelopes used at the time of this application typically will perform for a period of from sixty to one hundred retreading cycles. Factors that determine the life of a curing envelope are; a) the material used and the method and quality of their manufacture; b) care and handling by personnel in the retreading shops; and c) curing conditions to which the curing envelopes are exposed, e.g. high-temperature, pressure, and time length of such exposure.

Envelope Manufacturing

Presently curing envelope technology is deficient in performance in two particular areas. One deficiency is that prior art envelope products either lack adequate gauge (material thickness) control and/or possess material properties that lead to premature failures from excessive stretching and/or air leaks. These are the direct result of current (prior art) envelope manufacturing methods. The second deficiency involves the use of wicking devices to aid in the evacuation of air from between the outer surfaces (such as the new tread) of the retread tire being cured and the inner surface of these curing envelopes (see for example U.S. Pat. No. 5,173,353).

Present methods of manufacturing curing envelopes include using inner tube molds, compression molding, or die cutting disks from rubber sheets and cementing them together. The use of inner tube molds relies on a process in which it is very difficult to control gauge and thus creates difficulties in making a curing envelope that has the proper gauges (thicknesses) located where they are needed, leading to poor envelope performance. Using assembled envelopes from rubber sheets provides a product with a more constant gauge, but does not allow for variation in gauge within the design, and provides a weak joint where the material is assembled.

Envelopes have also been proposed to be made by an extrusion molding technique (see U.S. Pat. Nos. 4,116,605 & 4,198,367) but these must have one or more peripheral joints which results in an interruption around the envelope inner surface.

Prior current compression molding process provide the ability to design a curing envelope that can be contoured to the shape of the tire and permits the gauge of the envelope to be designed and varied in different sections of the curing envelope, and thus improve performance. However, this compression molding process uses a slug or ring of rubber placed in an open mold prior to closing the mold, and the pressure of closing the mold causes the rubber to squeeze between the mold and core as the press closes. Moving of the mold parts as the rubber flows through the mold can be inconsistent and lead to significant gauge variation. Thus present compression molding processes are sensitive to controlling the exact amount of rubber in the loaded slug or ring.

Also, such compression molding process has a tendency to produce laminations within the product (envelope) that may result in defective curing envelopes or envelopes that may fail prematurely. Other common problems associated with compression molding of curing envelopes are defects which are known in the industry as "trapped air' and/or 'non-fills" which may render the curing envelope non-usable.

SUMMARY OF THE INVENTION

The present invention relates to improvement in this particular area resulting from application and adaptation of injection molding technology to the process. All the mold parts are closed, aligned, and securely locked together before the rubber is injected into the mold.

This process provides the desired significant improvement in gauge control and localized gauge variation, which in turn dramatically improves and extends the life, performance, and functionality of the resultant novel curing envelope. The interior and exterior surfaces of the envelope are seamless. Injection molding these envelopes also eliminates other inherent problems related to compression molding, such as laminations, trapped air, and non-fill. The envelopes are sturdy, rigid enough to be self-sustaining, yet flexible enough to fit easily and snugly around the retread tire assembly to be cured.

One important factor in the successful curing of the pre-cured tread tires is the ability to bleed out the air between the outer surface of the tire and the inner surface of the curing envelope. The present invention provides for proper air bleed without the use of aforementioned air wicking fabric strips and/or the perforated polyethylene material, or other such means. Instead, the inside surface of the envelope is molded with a unique embossed pattern which is designed to channel to the vacuum valve, expeditiously, all the air being evacuated from between the outer surface of the tire and the inner surface of the envelope.

Additionally, a unique design feature has been applied to the valve base area; it is recessed so as to allow the air channels to open directly into the valve base area during evacuation. The envelope is also designed to accept various styles and designs of air valves.

Another unique feature is the creation of a decorative pattern on the inside shoulder area of a tire by transfer of a surface feature from the envelope interior. This pattern provides a significant improvement in the appearance of the finished tire. This is achieved by the design (e.g. configuration) of this pattern being produced on the mold core and being transferred to the novel curing envelope. This pattern then is permanently impressed and molded into the edges of the exposed gum rubber along the tread edges as the retread tire cures within the envelope. This results in an eclipse effect which obscures the otherwise apparent joinder of the tread edges to the carcass.

In addition to providing a unique injection molded curing envelope, the invention also provides a unique process for preparing a "retread package" of tire carcass, exteriorly applied gum rubber, and a new tread portion, for curing into a completed retreaded tire.

Other objects and advantages of the invention will be apparent from the following description, the accompanying drawings and the appended claims.

DESCRIPTION OF THE PREFERRED EMBODIMENT AND METHOD

Figure 1:
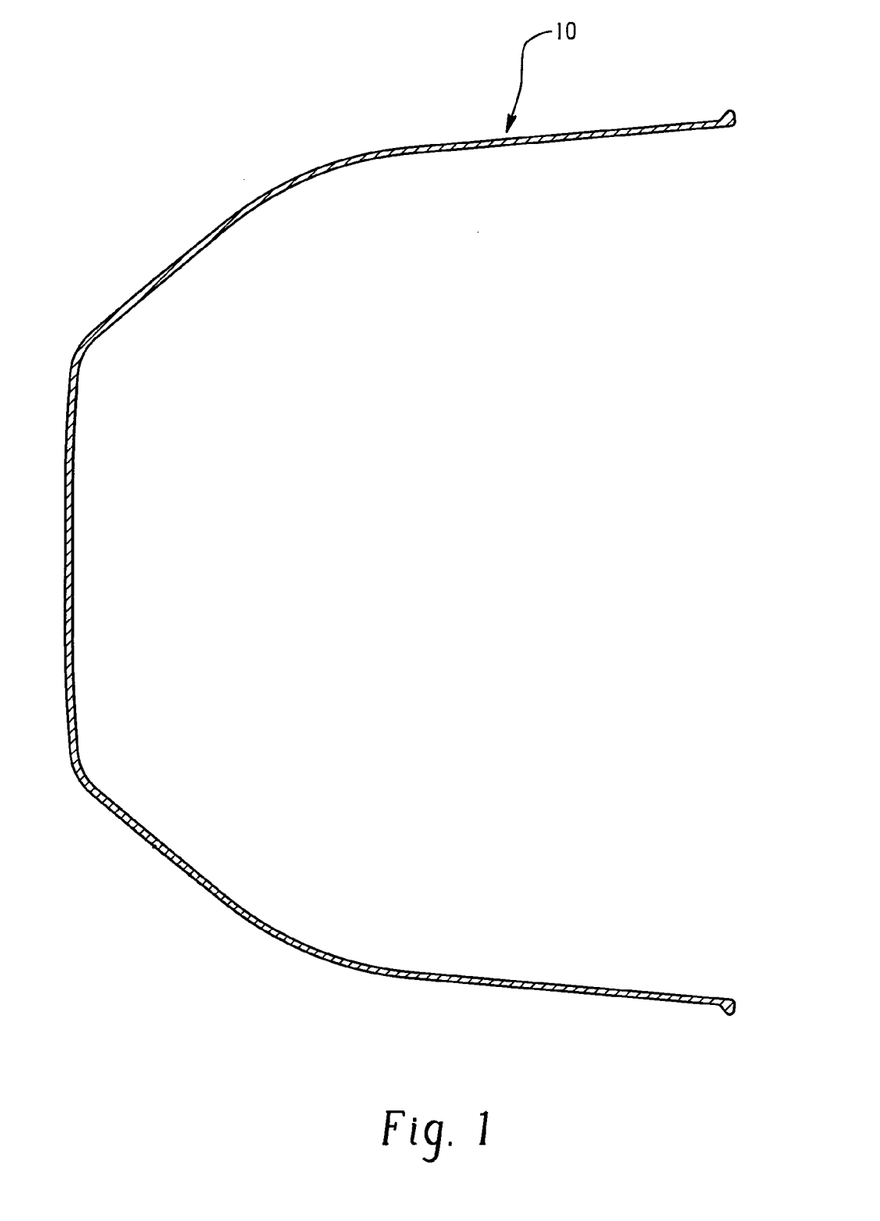
FIG. 1 is a transverse cross-section view of a molded curing envelope incorporating the features of the invention.
Figure 2:
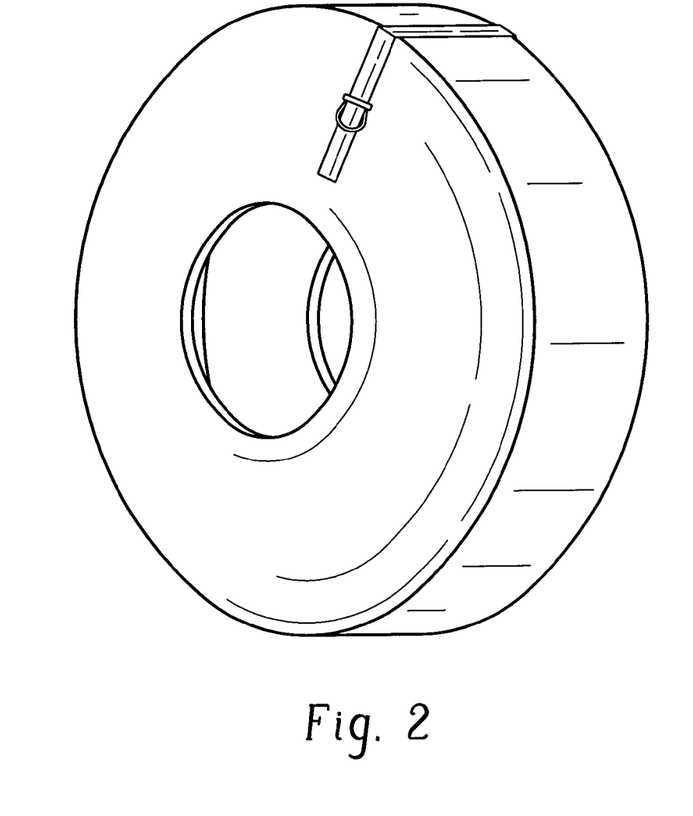
FIG. 2 is a perspective type view showing the envelope fitted around a tire carcass with retread components in place.
Figure 3:
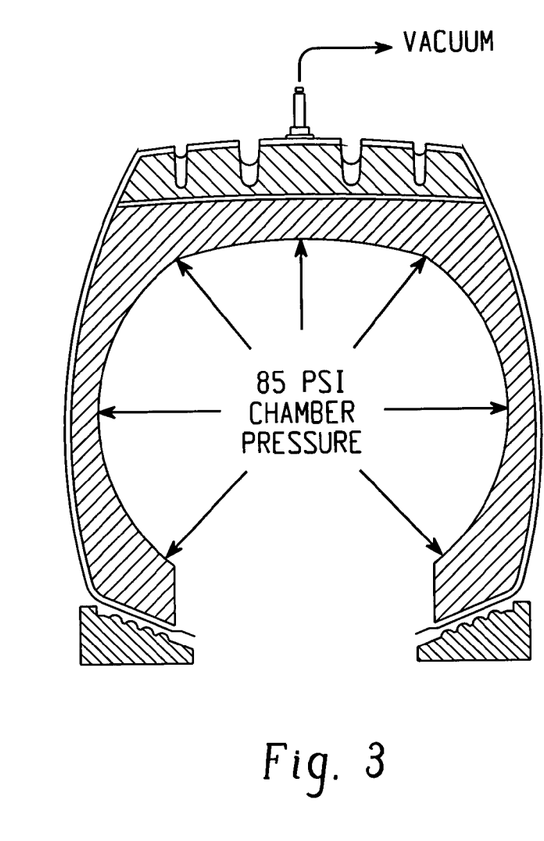
FIG. 3 is a schematic cross-sectional view through an envelope and retread assembly as shown in FIG. 2.
Figure 4:
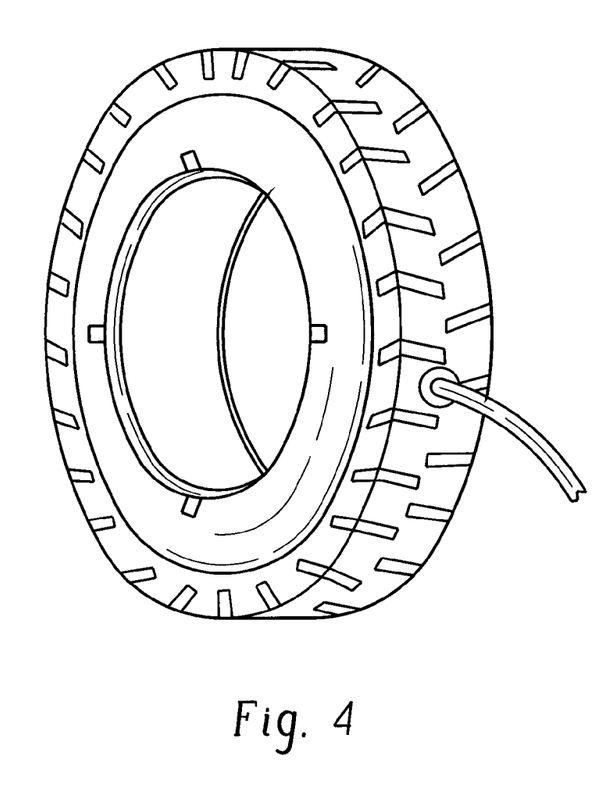
FIG. 4 is a perspective view similar to FIG. 1 with vacuum applied to the envelope interior, causing it to conform to the tread.
Figure 5:
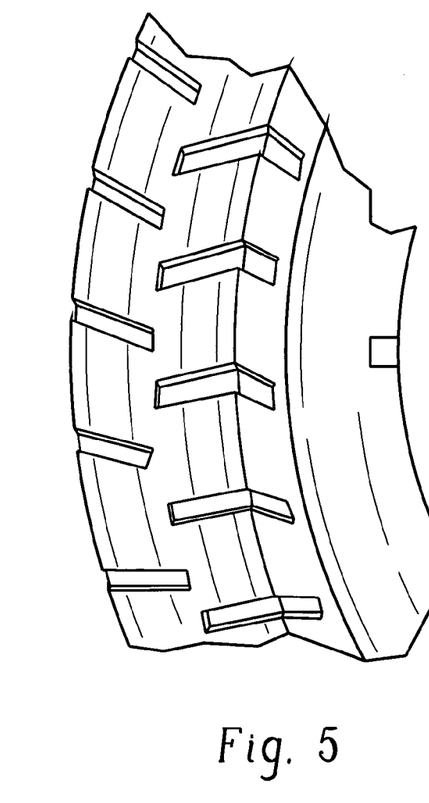
FIG. 5 is an enlarged view similar in nature to FIG. 4 illustrating conformation of the envelope to the retread assembly prior to curing.
Figure 8:
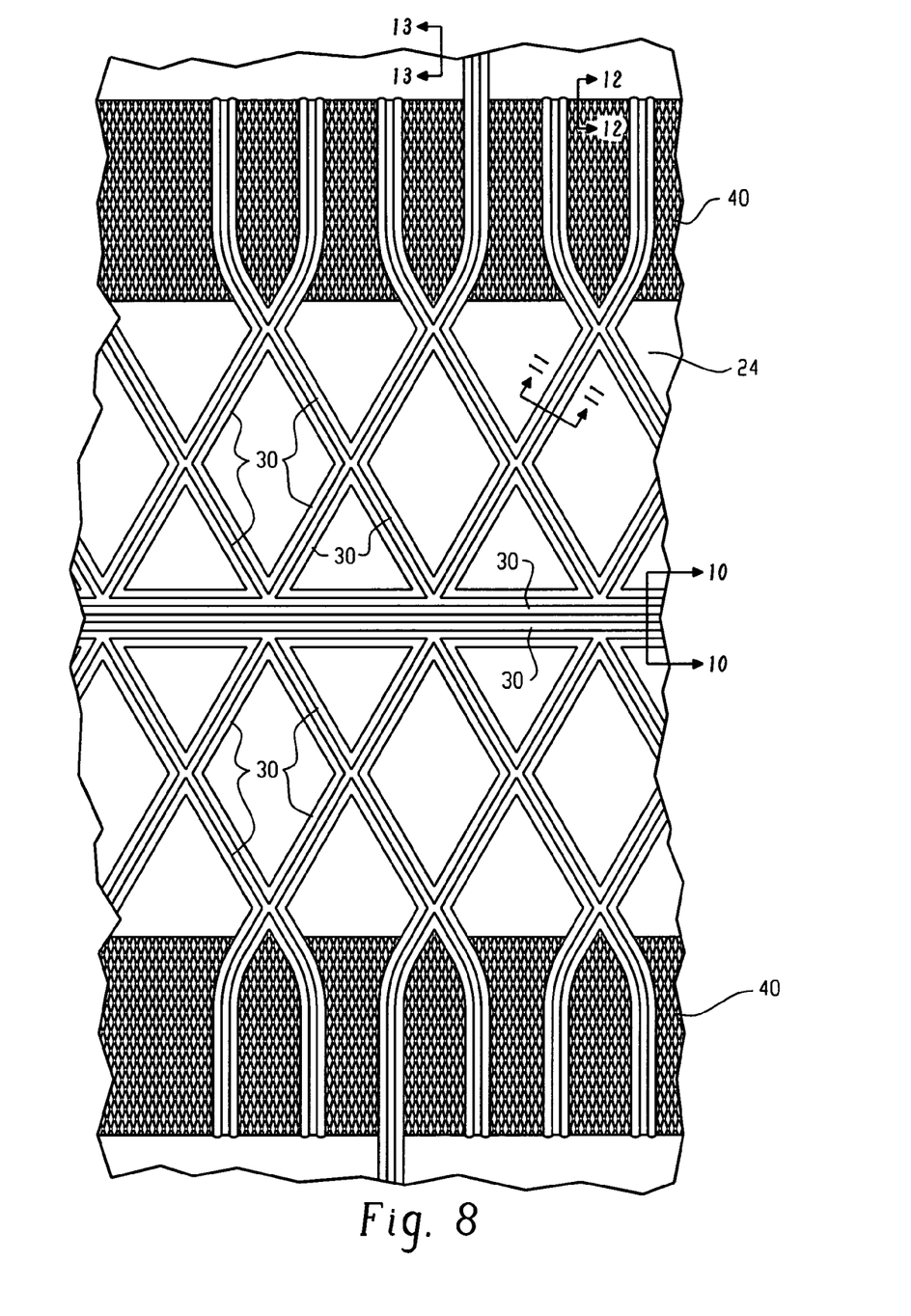
FIG. 8 is a view of a transverse segment of the exterior surface of a mold for making the curing envelope of FIG. 1, showing the configurations for forming integral air passages, and pattern designs, about the interior surface of the envelope.
Figure 9:
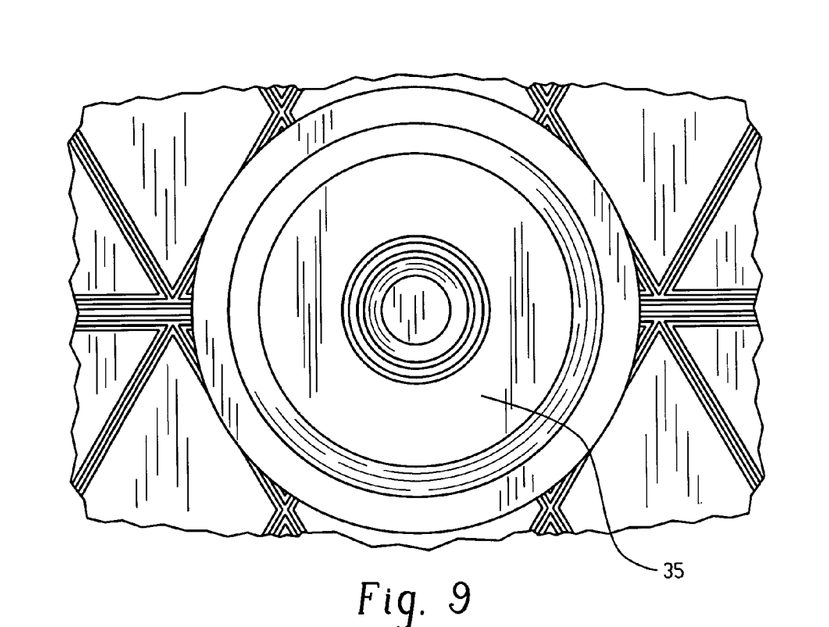
FIG. 9 is an enlarged segmental view of the region of the mold which forms an evacuating valve receptacle.
Figure 10:
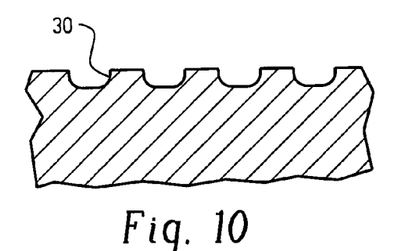
FIG. 10 is an enlarged cross-sectional view taken along line 10—10 in FIG. 8.
Figure 11:
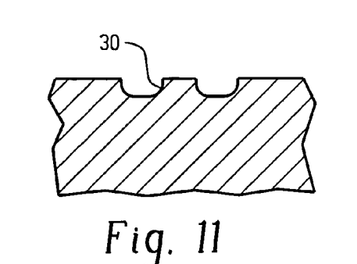
FIG. 11 is an enlarged cross-sectional view taken along line 11—11 in FIG. 8.
Figure 12:
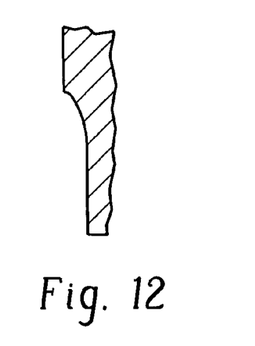
FIG. 12 is an enlarged cross-sectional view taken along line 12—12 in FIG. 8.
Figure 13:
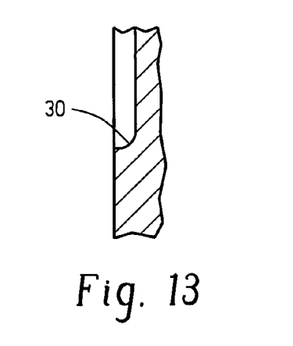
FIG. 13 is an enlarged cross-sectional view taken along line 13—13 in FIG. 8.
Figure 16:
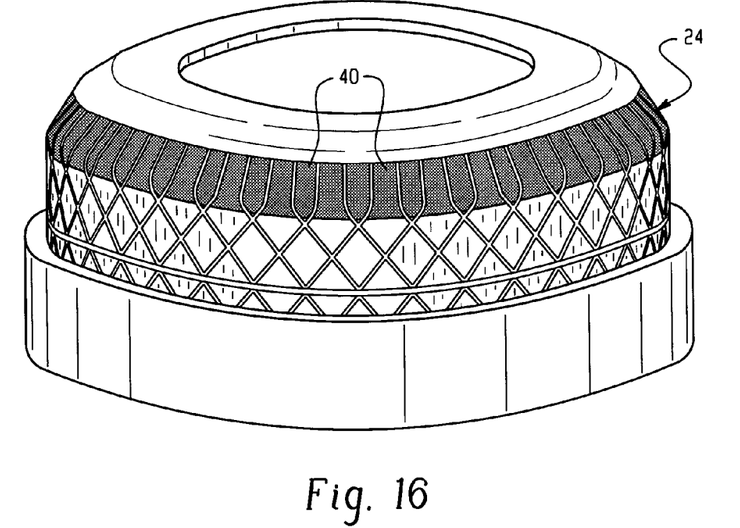
FIG. 16 is a pictorial perspective view of the envelope core positioned within the lower half of the molding apparatus.

Referring to FIG. 1, the cross-sectional configuration of a curing envelope 10, which embodies the unique features of the invention, is shown with exemplary dimensions that are intended to emphasize the control over material gage or thickness which is obtained by molding the envelope in a precision die set having a pair of mating mold halves 20A, 20B and a core 22 (FIG. 14) of conventional design. The surface of outer mold half 20A defines the smooth exterior surface of the resultant envelope, and the configured surface 24 of the core 22 (FIG. 16) defines the interior features of the envelope 10 (see FIG. 8).

Figure 14:
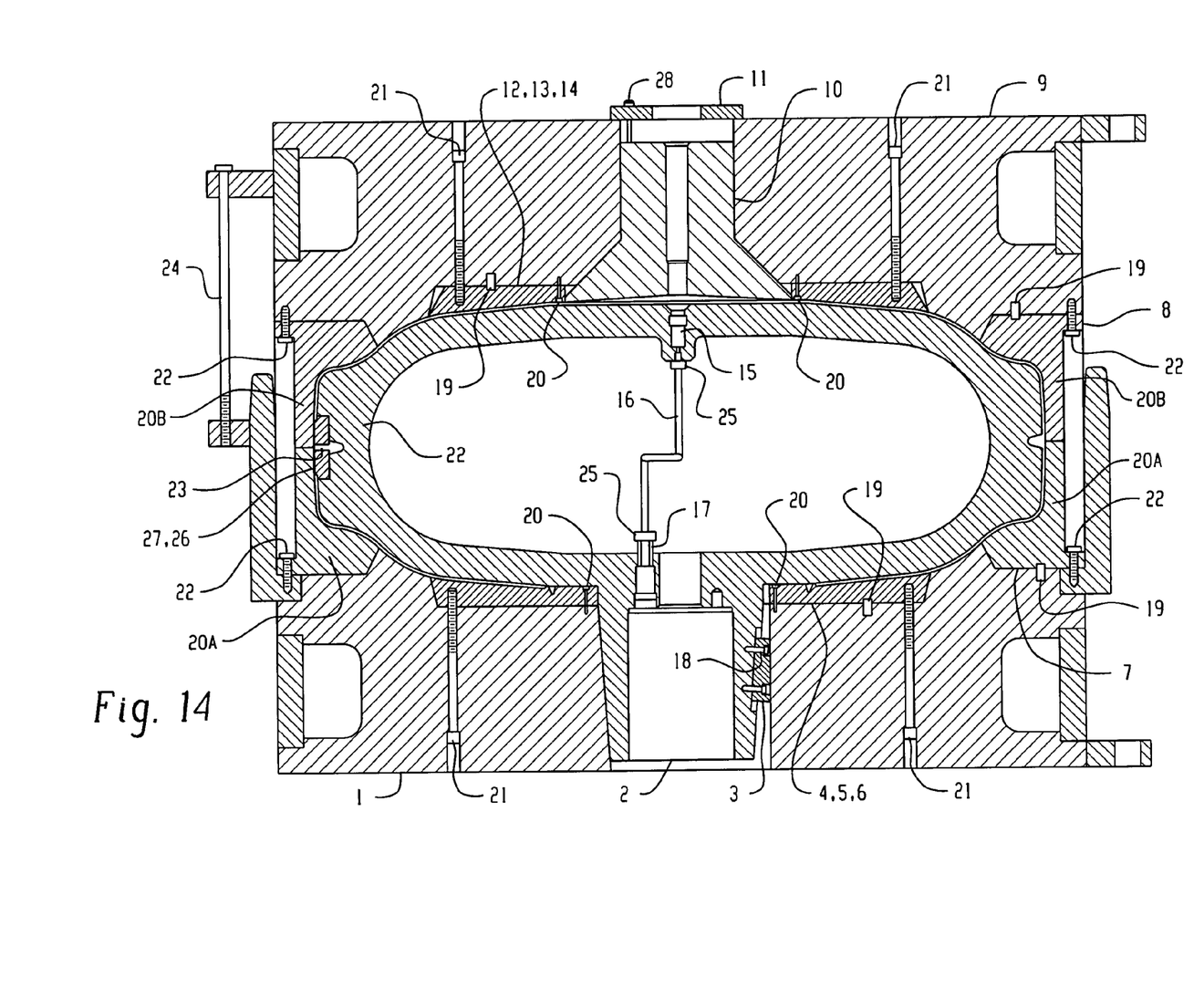
FIG. 14 is a cross-sectional view through an injection molding apparatus incorporating the mold of FIGS. 8–13.
Figure 15:
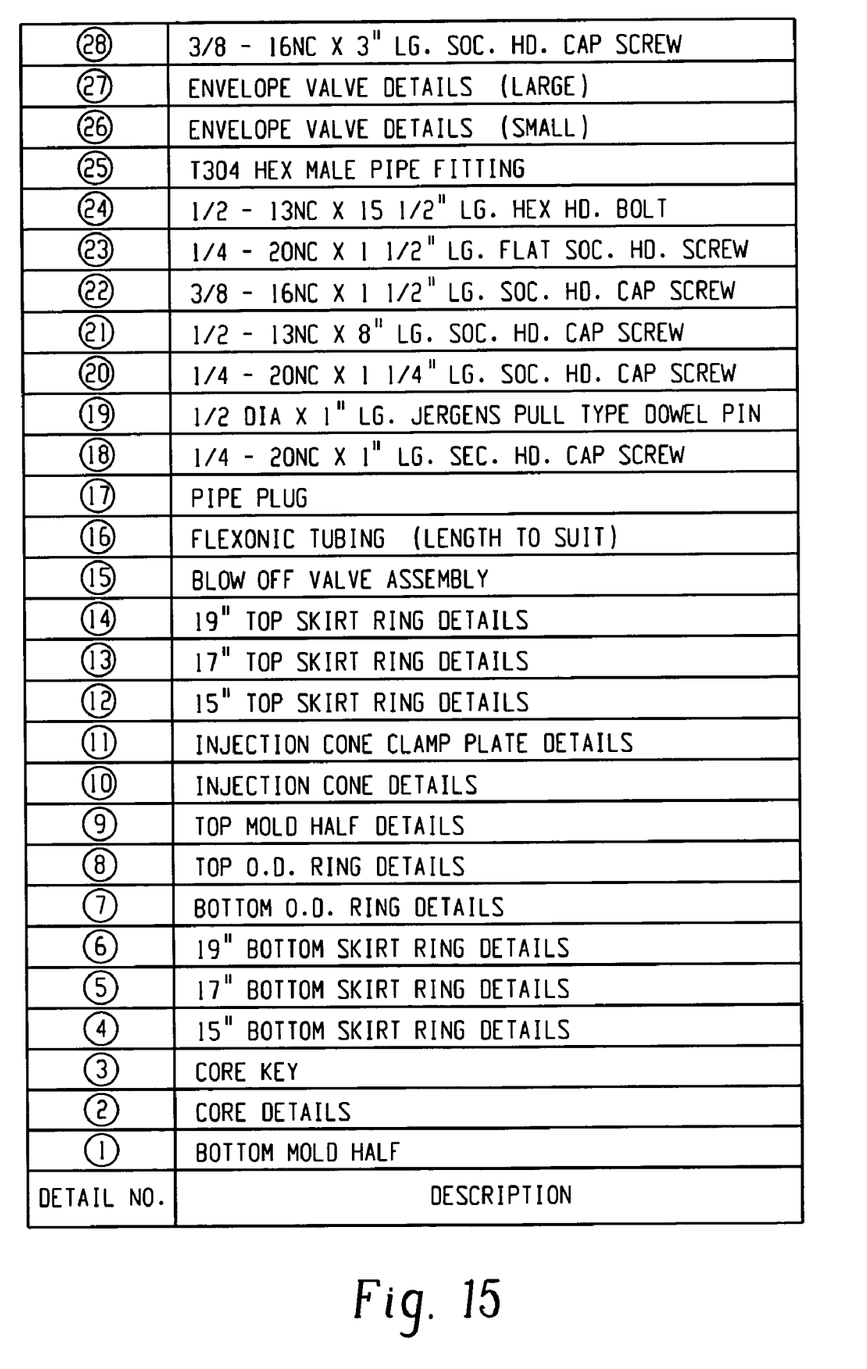
FIG. 15 is a parts list for the injection molding apparatus.

These molds halves and the core are closed and attached as shown in FIG. 14, and are then secured in a conventional injection molding apparatus (details not described). FIG. 15 is a parts list for FIG. 14, and the encircled numbers on FIG. 14 correspond to that list. When the mold halves 20A, 20B and core 22 are clamped together, they define the thickness and the exact configurations of the surfaces of a molded envelope 10, thin walled but sufficiently rigid to be self-sustaining, which is formed when an elastomeric material is injected into the cavity defined by the mold halves 20A, 20B and core 22, and solidifies.

FIGS. 8–13 and 16 illustrate the features of the configured surface 24, which in turn define the venting and decorative features that are unique to the curing envelopes 10 provided by the invention.

Figure 6:
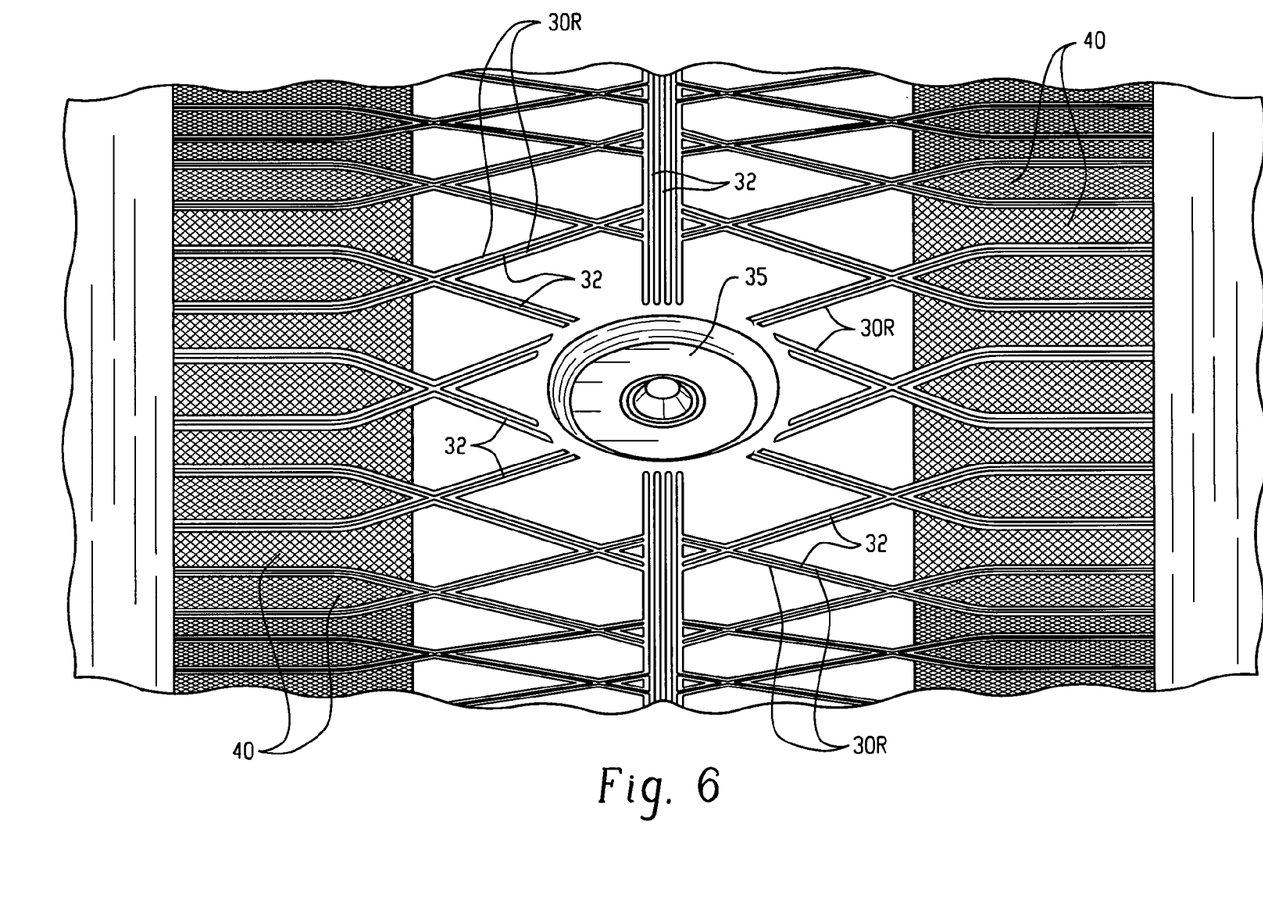
FIG. 6 is a view of a portion of the interior of the curing envelope.
Figure 7:
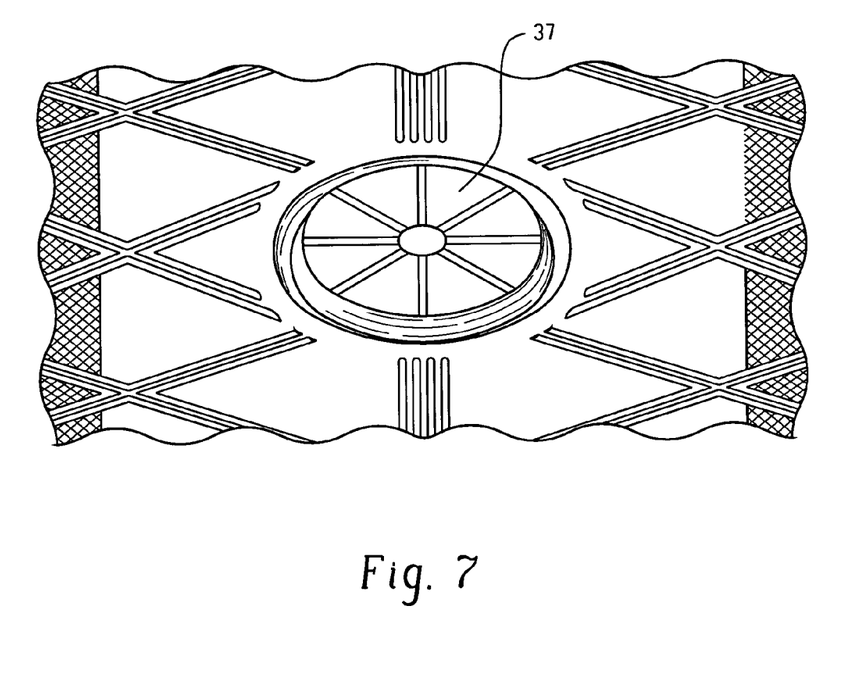
FIG. 7 shows a vacuum valve fitted into its receptacle cavity within the envelope.

A cris-cross lattice-like formation of grooves 30 (FIGS. 6, 8, & 16) extend around the entire surface or inner diameter surface of core 22, sufficient in lateral extent to cover the entire tread pattern of a tire plus the adjacent upper sidewall region. Thus grooves 30 in the core surface result in protruding ribs 30R (FIG. 6) from the interior surface of the envelope, and those ribs, which are (for example) in the order of 0.045 to 0.050 inches high, define an interconnected set of air evacuation or venting passages 32 leading to a shallow cavity 35 which contains a check valve 37.

Figure 17:
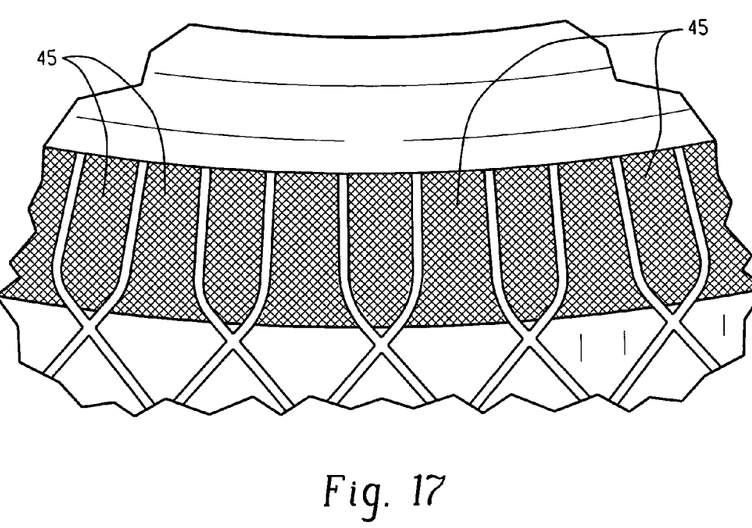
FIG. 17 is a segmental view of the outer sidewall and tread junction of a retread tire made using the curing envelope.

In addition, the patterned surfaces 40 along the sides of the grooves (top and bottom in FIG. 8) are pressed against the outer sidewall regions of the tire, particularly at the outside edges or interface of the joint where the carcass, gum rubber, and tread are joined, leaving a decorative pattern 45 (FIG. 17) on the finished tire. This pattern is shown In the form of a diamond mesh design, having a plurality of elongated spaces which may be (for example) in the order of 0.010 inch in depth, but may be of any desired configuration.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

Having thus described the invention, it is now claimed:

1. A curing envelope for retreading an associated tire having a sidewall and tread that join along an interface, the curing envelope comprising:
    an envelope wall including an inner surface to surround the associated tire, the inner surface having a continuous passage formed therein;
    a valve opening extending through the envelope wall and in fluid communication with the passage; and
    a decorative pattern on the inner surface that is located at an interface of a tire sidewall with a tread to obscure the interface, the continuous passage extending into the decorative pattern.

2. The curing envelope of claim 1 further comprising a valve received in the valve opening.

3. The curing envelope of claim 1 wherein the continuous passage includes a predetermined pattern of interconnected passage portions that are in fluid communication with the valve opening.

4. The curing envelope of claim 1 wherein the continuous passage is formed by a lattice-like pattern that extends over the entire inner surface of the envelope wall.

5. The curing envelope of claim 1 wherein the decorative pattern is interrupted along the inner surface by the continuous passage.

\* \* \* \* \*